(No Model.)  2 Sheets—Sheet 1.

A. J. MOXHAM.
RAILROAD RAIL AND SUPPORT.

No. 495,986. Patented Apr. 25, 1893.

WITNESSES:
Francis P. Riley
W. F. Brückel

INVENTOR
A. J. Moxham
BY
P. N. Voorhees
ATTORNEY.

(No Model.) 2 Sheets—Sheet 2.
A. J. MOXHAM.
RAILROAD RAIL AND SUPPORT.
No. 495,986. Patented Apr. 25, 1893.
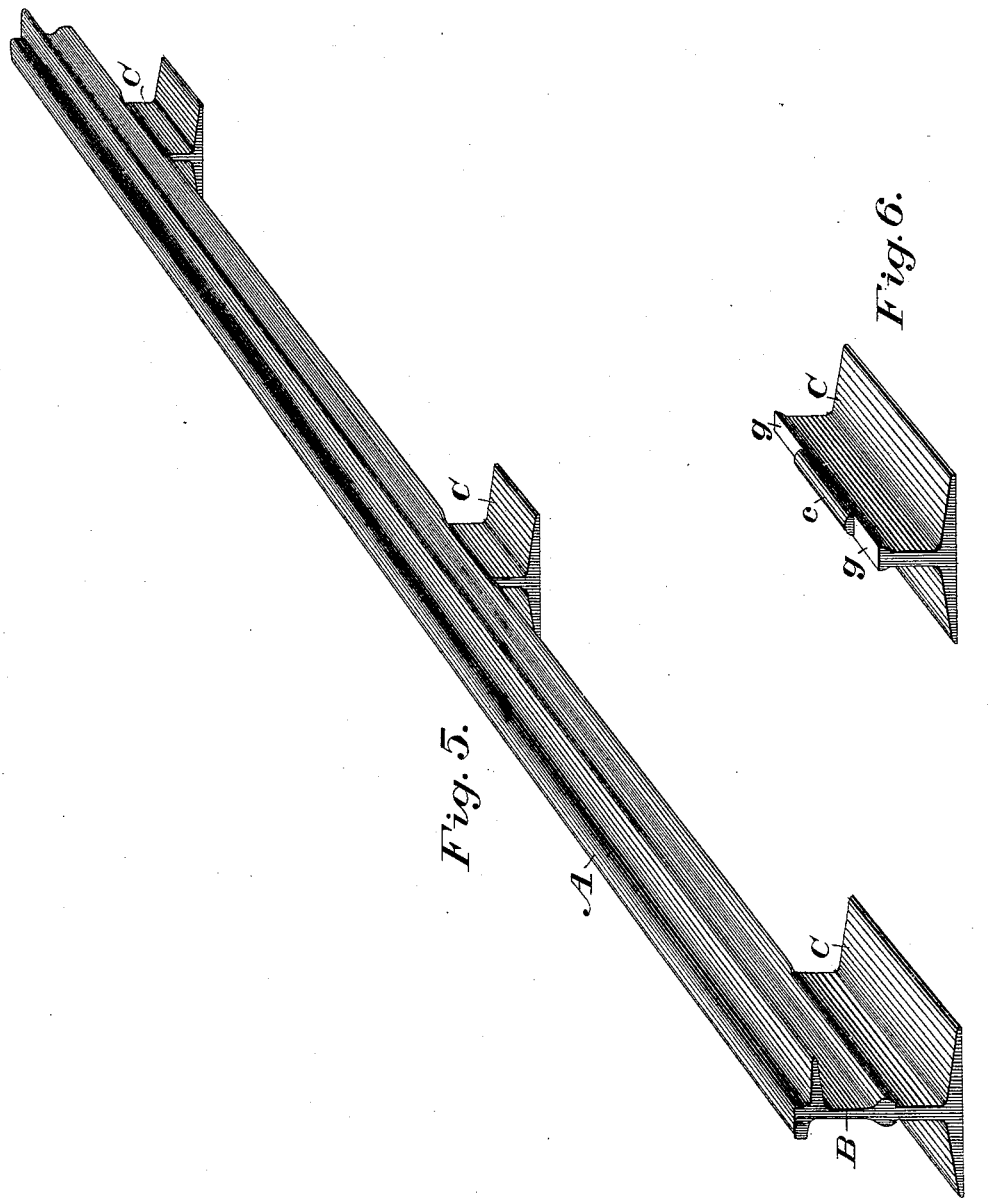
WITNESSES:
Francis P. Reilley
W. F. Brückel
INVENTOR
A. J. Moxham
BY P. R. Voorhees
ATTORNEY.

UNITED STATES PATENT OFFICE.

ARTHUR J. MOXHAM, OF JOHNSTOWN, PENNSYLVANIA.

RAILROAD-RAIL AND SUPPORT.

SPECIFICATION forming part of Letters Patent No. 495,986, dated April 25, 1893.

Application filed April 27, 1892. Serial No. 430,922. (No model.)

*To all whom it may concern:*

Be it known that I, ARTHUR J. MOXHAM, of Johnstown, in the county of Cambria and State of Pennsylvania, have invented a new and useful Railroad-Rail and Support, which invention is fully set forth and illustrated in the following specification and accompanying drawings.

The object of this invention is to unite a rail and support together so as to form an integral structure.

Figure 1:
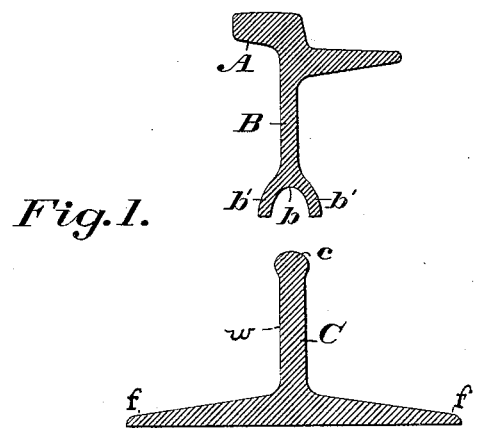
Figure 4:
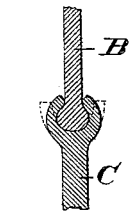
Figure 2:
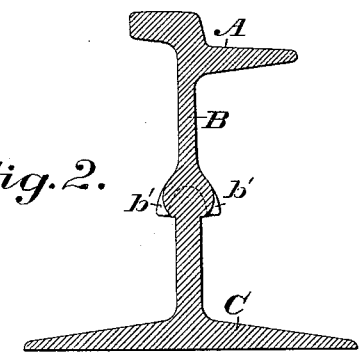
Figure 3:
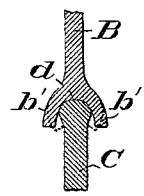

I now proceed to describe the invention as follows:

In the accompanying drawings, Figure 1 shows in cross-section, separate from each other, a rail and support embodying my invention. Fig. 2 shows said rail and support united, as hereinafter described. Fig. 3, shows a portion of said rail and support, illustrating the appearance of the parts before the structure herein described has been entirely completed. Fig. 4 shows, in cross-section a modified form in which my invention may be applied. Fig. 5, shows in perspective a rail having supports united to it at intervals and embodying my invention. Fig. 6 is a view in perspective of a support showing a certain detail hereinafter described.

In said figures the several parts are respectively indicated by reference letters as follows:—

The letter A, indicates a railroad rail having a web B and a bifurcation or downwardly extending flanges $b'$, at the bottom of said web, between which flanges is the groove or channel $b$.

The letter C, indicates a base or support having base-flanges $f$, a web $w$, and a bead or projection $c$, at the top of said web.

The rail and support having been separately rolled, or otherwise formed, the bead or head $c$, of the support is inserted in the groove or channel $b$, in the rail, between the flanges $b'$, and the rail and support are then welded together at the bottom of said groove, as shown at $d$, Fig. 3, or otherwise united to form an integral structure. This welding may be accomplished by means of electricity or by any other suitable process or means of welding. When the rail and support have been so welded together, the two flanges $b'$, of the rail, are compressed, or forced toward each other, by any suitable mechanical means, so that they will clamp the head $c$ of the base or support, as shown in dotted lines in Fig. 3 and in full lines in Fig. 2. This compression is preferably done immediately after the welding, in which case the flanges $b'$, having been more or less heated during the welding operation, are more readily compressed to grasp the head $c$ of the support and, by reason of subsequent contraction in cooling, more firmly grasp said inclosed head. It will therefore, be readily understood that when its treatment has been thus completed, the welded portion of the structure is inclosed by sections of metal which have not been materially effected by the welding operation, thus preventing possible deterioration of metal.

In the operation of welding, if the welding point of heat attacks the extreme outside of a long bar of steel on edge, the treatment is liable to induce heat-cracks, on this outside edge, which heat-cracks, or any other deterioration, if on such outside edges, induce great weakness in the structure. But if the deteriorated part is entirely surrounded by good material, as is done by the invention herein described, the starting point of weakness is thus removed from the place or edge where it might do serious harm to a place where its presence can do no harm.

Instead of forming the rail with the flanges $b'$ and the support with the bead $c$, the support may be formed with said flanges and the rail with the bead, as shown in Fig. 4.

If desired, a portion of the head of the support may be cut away as shown at $g$, Fig. 6, in order to reduce the area to be welded, which may be advantageous especially if long supports are used.

It is obvious that the shapes of the upper portion of the rail and the lower portion of the base or support shown may be varied without departing from my invention. And while it is deemed preferable to provide either the rail or support with a bead such as $c$, said bead may be omitted, if desired, in the rolling, and formed by "upsetting" the metal in the process of forging or welding the two parts together; or said bead may be entirely omitted where the metal of the web is of sufficient thickness for good welding.

Having thus fully described my said invention, I claim—

1. A railroad rail and support, one having flanges or jaws on its web and the other a bead, the webs of the rail and support being welded together and the flanges or jaws being compressed upon the bead.

2. A railroad rail and support, one having a bead and the other flanges or jaws on its web, the bead being welded to the rail between the flanges or jaws and the latter compressed upon the welded joint.

3. The combination with a railroad rail, having jaws or flanges at the bottom of its vertical web, of a support having a head adapted to fit between said jaws, said rail and support being welded together and said jaws being compressed upon and inclosing the welded joint.

4. The combination with a railroad rail having jaws at the bottom of its vertical web, of a support having base-flanges, a vertical web and a head adapted to fit between said jaws, said rail and support being welded together and said jaws being compressed upon and inclosing the welded joint.

5. A railroad rail and support welded together and inclosed at the welding point with metal unacted on in the welding.

ARTHUR J. MOXHAM.

Witnesses:
D. BRYAN,
A. J. BRYAN.